(12) United States Patent
Puga et al.

(10) Patent No.: US 7,990,612 B2
(45) Date of Patent: Aug. 2, 2011

(54) BOTTLE TELESCOPE

(75) Inventors: Richard A. Puga, Wailuku, HI (US);
Daniel G. O'Connell, Wailuku, HI (US);
Terry D. Born, Wailuku, HI (US)

(73) Assignee: HNU Photonics, Wailuku, HI (US)

(*) Notice: Subject to any disclaimer, the term of this patent is extended or adjusted under 35 U.S.C. 154(b) by 0 days.

(21) Appl. No.: 11/987,353

(22) Filed: Nov. 29, 2007

(65) Prior Publication Data
US 2008/0204867 A1 Aug. 28, 2008

Related U.S. Application Data

(60) Provisional application No. 60/861,435, filed on Nov. 29, 2006.

(51) Int. Cl.
*G02B 23/00* (2006.01)
(52) U.S. Cl. .......................... 359/399; 359/407; 359/601
(58) Field of Classification Search .................. None
See application file for complete search history.

(56) References Cited

U.S. PATENT DOCUMENTS

| | | | |
|---|---|---|---|
| 2,620,706 A * | 12/1952 | Levin | 359/399 |
| 3,397,935 A | 8/1968 | Natsume | |
| 4,770,519 A * | 9/1988 | Jacques | 359/408 |
| 5,904,267 A | 5/1999 | Thompson | |
| 5,936,765 A | 8/1999 | Walsh | |
| 6,199,710 B1 | 3/2001 | Jensen | |
| 2002/0185212 A1 | 12/2002 | Schaupp et al. | |
| 2006/0061854 A1 | 3/2006 | Dane et al. | |
| 2006/0103924 A1 | 5/2006 | Katz | |

* cited by examiner

*Primary Examiner* — Stephone B Allen
*Assistant Examiner* — Derek S Chapel
(74) *Attorney, Agent, or Firm* — Morgan Lewis & Bockius LLP

(57) ABSTRACT

A hand-held telescope or binocular built into a bottle or consumable drink container includes a high quality objective lens; an adjustable focus eye lens; and, optionally, a connector ring to form a binocular; a jacket, sleeve or cuzzi containing information regarding, for example, sporting or scientific events; a baffle to minimize extraneous light from disturbing observational clarity; and a holographic bottle label that portrays sporting or scientific figures in three dimensions.

22 Claims, 12 Drawing Sheets

Figure 5. Keplerian Bottle Telescope:
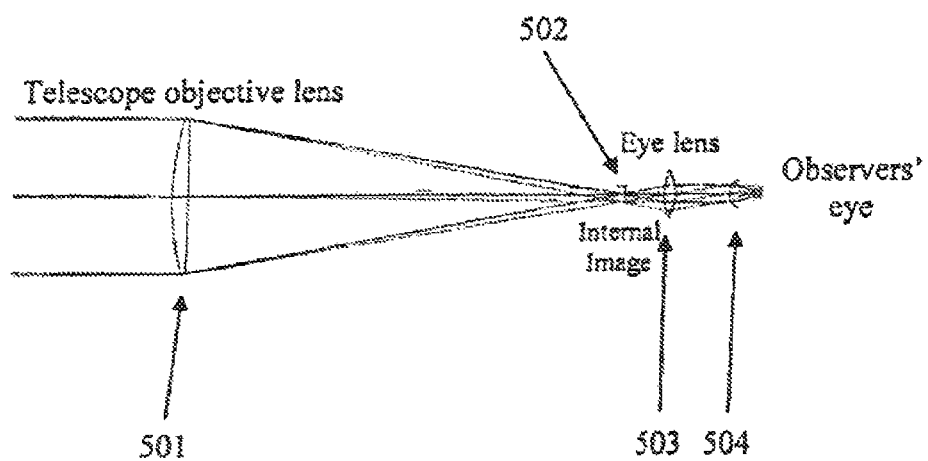

Figure 6. Molded plastic inverting prism.
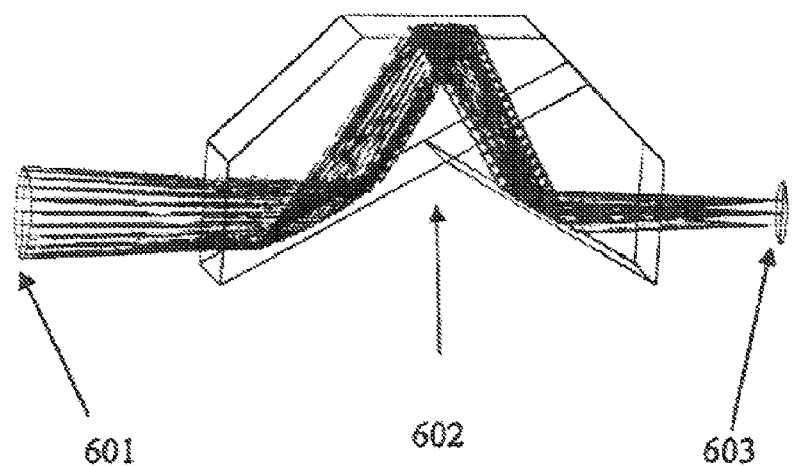
601      602      603

Figure 7. Galilean Bottle Telescope.
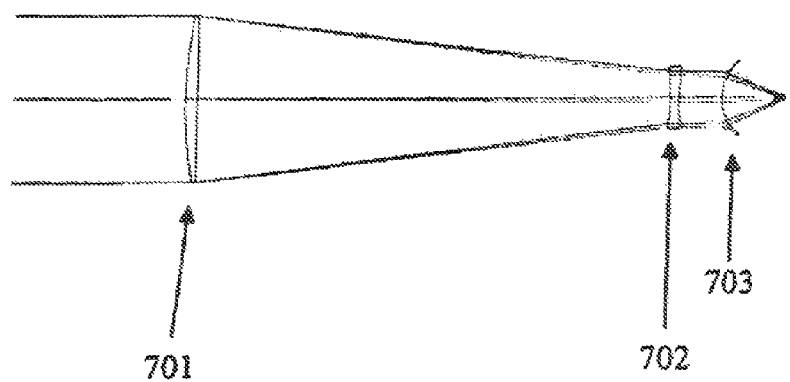
701    702    703

Figure 8. Fresnel lens Bottle Telescope.
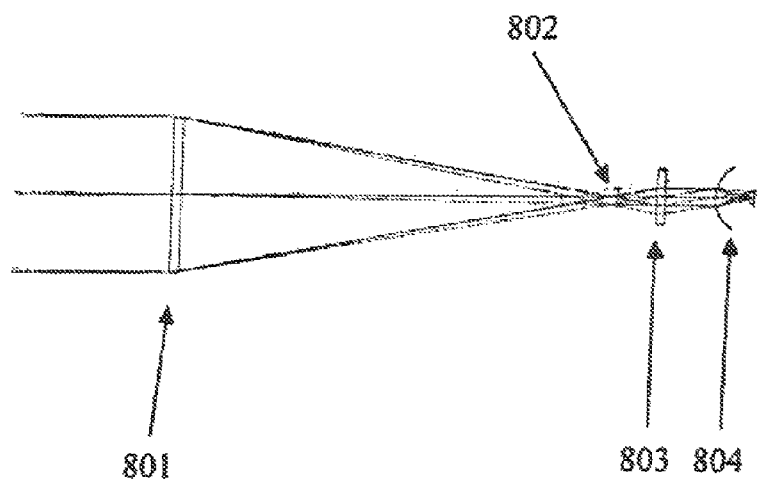

Figure 9. Fresnel lens Bottle Telescope:
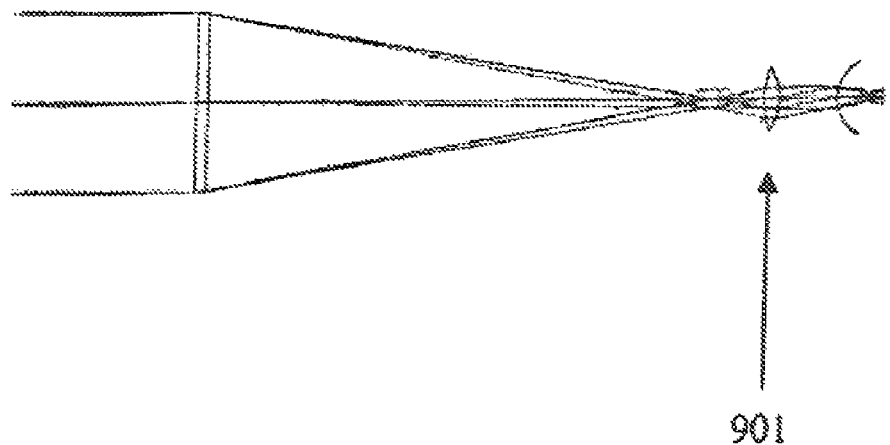
901

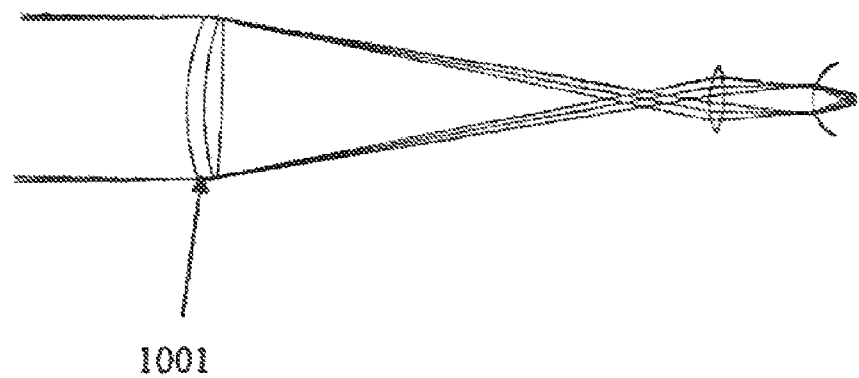
Figure 10. Doublet achromatic objective lens.
1001

Figure 11. Double element eye lens.
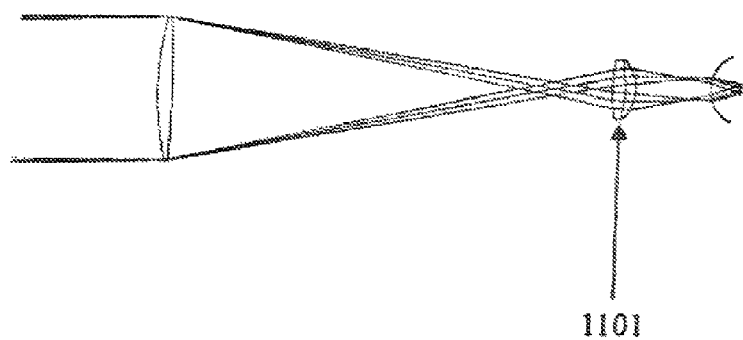
1101

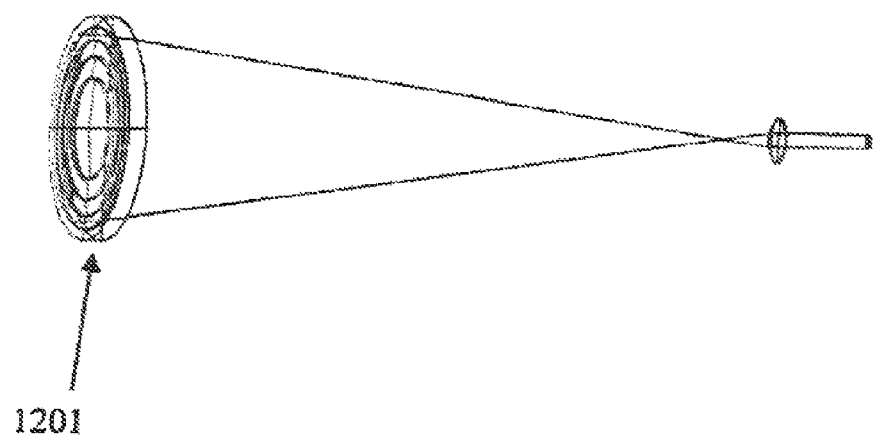
Figure 12. Molded diffractive lens.
1201

BOTTLE TELESCOPE

The present invention claims the benefit of U.S. Provisional Application No. 60/861,435, filed on Nov. 29, 2006, which is hereby incorporated by reference in its entirety.

BACKGROUND OF THE INVENTION

1. Field of the Invention

The present invention relates to a handheld telescope or binoculars, and more particularly to a self contained telescope that is built into a bottle that contains a liquid beverage, such as a water bottle, for example.

2. Description of Related Art

Plastic telescopes have been on the market for a number of years including PVC telescopes comprising Polyvinyl Chloride (PVC) parts to construct the telescope tube and lens holders. These telescopes can be useful and educational; however, in addition to costing tens of dollars, they are bulky, cumbersome and not practical to have on hand at all times.

The Beer Bottle Telescope manufactured by Apogee provides a unique entertaining item that is an accurate spotting scope. This telescope, which is priced at around $20.00 (at the drafting of this application), is not suitable for containing liquid beverages and does not provide binocular viewing.

Accordingly, there is an opportunity to remedy the deficiencies in the art and to produce a quality, compact and portable, self-contained telescope or binocular built into a bottle that contains a liquid and costs less than $10 or potentially less than $5 (again, at the drafting of this application).

SUMMARY

Accordingly, the present invention is directed to a portable telescope built into a bottle that is suitable for containing a fluid, including, but not limited to, a consumable liquid refreshment such as a soft drink, water, vitamin water, tea, fruit juice, fruit drink, energy drink, milk, or beer.

In one embodiment, the invention relates to a bottle telescope (also referred to herein as BottleScope) comprising a sealable bottle suitable for containing a fluid, the bottle comprising: at least one objective lens built into the base of the bottle and an adjustable eye lens built into a removable bottle cap. When viewed through the eye lens, the bottle functions as a telescope.

In another embodiment, the bottle telescope can include an optional light baffle to reduce objectionable stray light. The light baffle can be a removable tube that slides into the bottle, the tube comprising a flange that seats at the opening of the bottle or is attached to the bottle cap.

In another embodiment, the bottle telescope can include a bottle sleeve approximately perpendicular to both the objective lens and the eye lens, wherein the sleeve is either external or internal to the bottle.

In another embodiment, the removable cap is attached to the bottle using threads and the focus of the eye lens is adjusted using threads. The telescope can have a magnification of from 3× to 25×.

In an embodiment of the invention, the objective lens is molded, machined, or threaded into the base of the bottle. In certain embodiments, the objective lens can be a single refracting lens, an achromatic doublet lens, a Fresnel lens, a diffractive lens or a hybrid lens that combines refracting and diffracting properties. In certain embodiments, the eye lens can be molded, machined, or pressed into the bottle cap.

In other embodiments, the removable cap is attached to the bottle sleeve using threads which can be used to adjust the focus of the eye lens. In certain embodiments, the bottle telescope of the present invention can be based on a Keplerian telescope configuration. In other embodiments, the bottle telescope of the present invention can be based on a Galilean telescope configuration.

In another embodiment, the bottle telescope can comprise a label which is a 3-dimensional holographic display.

In certain embodiments, the objective lens is injection molded, comprises a side flange and is welded to the base of a blow molded plastic bottle whose base has been cut off. In other embodiments, the objective lens is an injection molded spherical or aspheric lens for aberration control.

In another embodiment, the eye lens is injection molded into the bottle cap. In other embodiments, the eye lens is pressed and sealed into the bottle cap.

In another embodiment, the invention is directed to two sealable bottles suitable for containing a fluid, the bottles each comprising at least one objective lens built into the base of the bottle and an adjustable eye lens built into a removable bottle cap. In this embodiment, the bottles are connected using a removable connector and, when viewed through the eye lens, function as a pair of binoculars. In another embodiment, the bottle connector is part of a removable multiple bottle carry pack.

In another embodiment, the bottle telescope further includes at least one bottle that can range in size from under 0.5 Liter up to 5 Gallon water bottle.

In another embodiment, the bottle telescope is manufactured using a plastic molding process that is prevalent in the plastic bottling industry.

In another embodiment, the bottle telescope lenses are attached to the bottle using plastic molding or welding process.

In yet another embodiment, the bottle telescope container may be constructed from one or a combination of the following: Polyethylene Teraphthalate (PET), Polycarbonate, Low or High density Polyethylene (LDPE), (HDPE), Polypropylene, Polystyrene or other plastic.

In another embodiment, the bottle telescope container may be constructed from molded or machined plastic; however, glass can be used to replace the plastic in certain configurations of the bottle telescope.

Additional features and advantages of the invention will be set forth in the description which follows, and will be apparent, in part, from the description, or may be learned by practice of the invention. The objectives and other advantages of the invention will be realized and attained by the structure particularly pointed out in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a conceptual diagram of a bottle telescope comprising a Keplerian telescope configuration having a positive focal length objective lens and positive focal length eye lens.

FIG. 6 is a conceptual diagram of a bottle telescope comprising an inverting prism to form an upright image in the Keplerian telescope.)

FIG. 7 is a conceptual diagram of a bottle telescope comprising a Galilean telescope configuration having a positive focal length objective lens and a negative focal length eye lens.

FIG. 8 shows a bottle telescope comprising Fresnel lenses.

FIG. 9 shows a bottle telescope comprising a combination of a Fresnel lens and a conventional lens.

FIG. 10 shows a bottle telescope comprising a two element objective lens for improving image quality by controlling such aberrations as chromatic and spherical aberration.

FIG. 11 shows a bottle telescope comprising a two element eye lens for improving image quality by controlling aberrations such as lateral color and spherical aberration.

FIG. 12 shows a bottle telescope comprising molded or pressed diffractive lenses.

DETAILED DESCRIPTION OF THE INVENTION

Conventional consumer telescopes are readily available from a number of stores; however, they are not always available when they are most needed, such as at sporting events, on nature walks or the like. For many applications it is impractical to have a portable telescope on hand when it would be most useful. Therefore, there is a need for a high quality portable bottle telescope or binocular that is available to everyone, suitable for, e.g., sporting events, nature walks, astronomical viewing of the moon, planets, stars, and which is capable of observing virtually any distant object with high quality magnification built into a water bottle or other refreshment container. The innovative BottleScope is a low cost but high quality compact telescope or binocular that is built into a liquid container (e.g., a liquid refreshment container) and can be sold at, for example, sporting events so that every fan or onlooker can enjoy close up viewing of these events even from distant locations in a stadium, field or track. The BottleScope can be built into, for example, recyclable plastic water bottles and sold as six packs or twelve packs. This would put a high quality telescope in the hands of everyone that would benefit from a telescope or binocular at virtually any given moment The present invention is directed to a self-contained multi-purpose portable telescope or binoculars built into a bottle suitable to contain a fluid, for example, a liquid refreshment, and capable of medium magnifications between 3× and 25×, as used in convenient telescope viewing applications.

Figure 1:
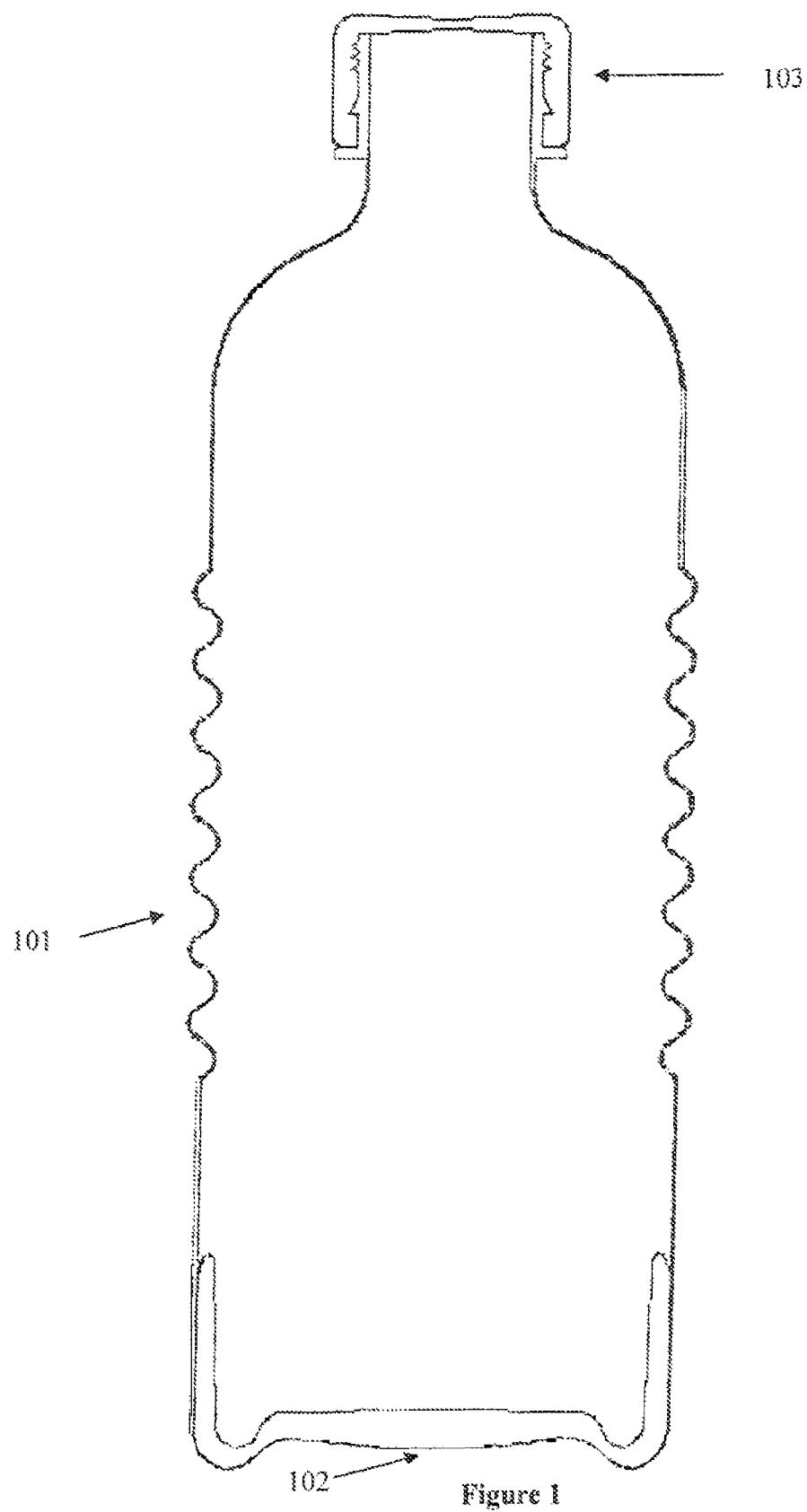
FIG. 1 is a conceptual diagram of the molded plastic bottle telescope with objective lens fabricated in the base of the bottle. The eye lens is built into the cap providing a seal as well as adjustable focus when in use.

The BottleScope is an inexpensive telescope built into a bottle, for example, a container for a liquid beverage (see FIG. 1). Consumers will be able to enjoy liquid refreshments and then have an inexpensive, recyclable telescope or binoculars at their disposal. FIG. 1 shows a single piece molded plastic bottle telescope 101 with an objective lens 102 fabricated in the base of the bottle. The eye lens is built into the cap 103, which provides a seal as well as serve as an adjustable focus when the telescope is in use.

Figure 2:
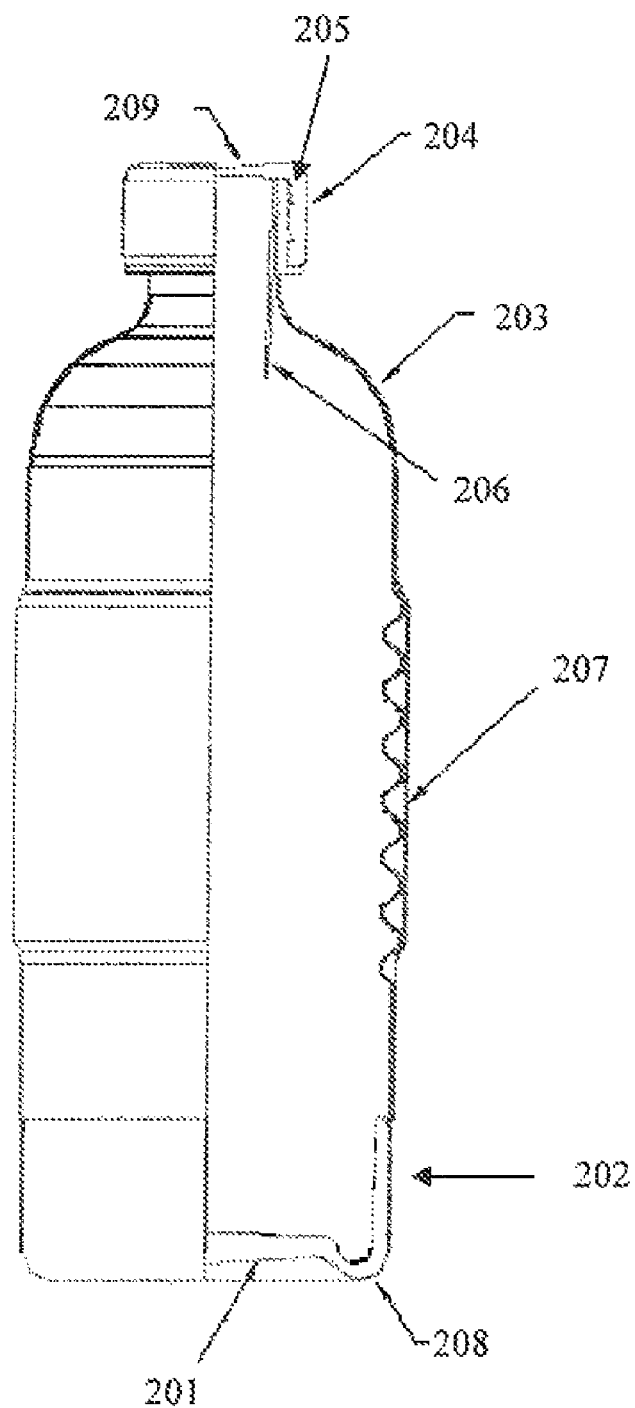
FIG. 2 depicts a cross section of BottleScope showing the lens flange attached to the base of the bottle telescope and cross section of bottle cap threads that provide adjustable focus of the BottleScope.

The telescope components are constructed as part the bottle structure and can be made in 3 parts or 2 parts as described herein. FIG. 2 shows a cross section of the bottle telescope 203, including an objective lens 201, objective lens flange 202 and eye lens-containing cap 204. Moreover, FIG. 2 shows threads 205, which are used to adjust the focus of the eye lens; light baffle 206 (which can also be in the form of a removeable tube that slides into the bottle); bottle sleeve 207, which is approximately perpendicular to both the objective lens and the eye lens; bottle base 208 with an aspheric lens molded in for image correction; and eye-piece lens 209.

Figure 3:
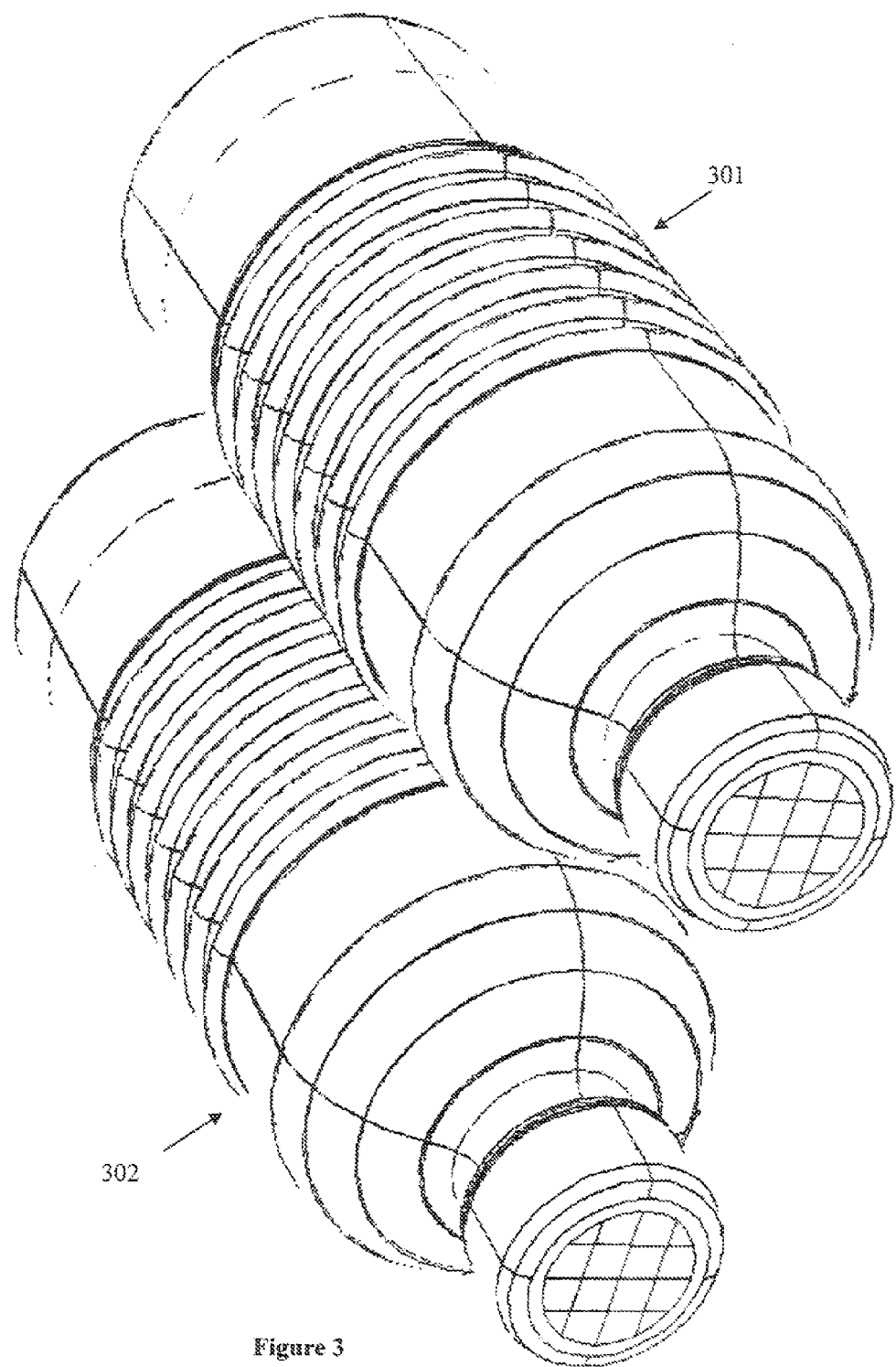
FIG. 3 is a conceptual diagram of two bottle telescopes joined together to form a BottleScope Binocular.
Figure 4:
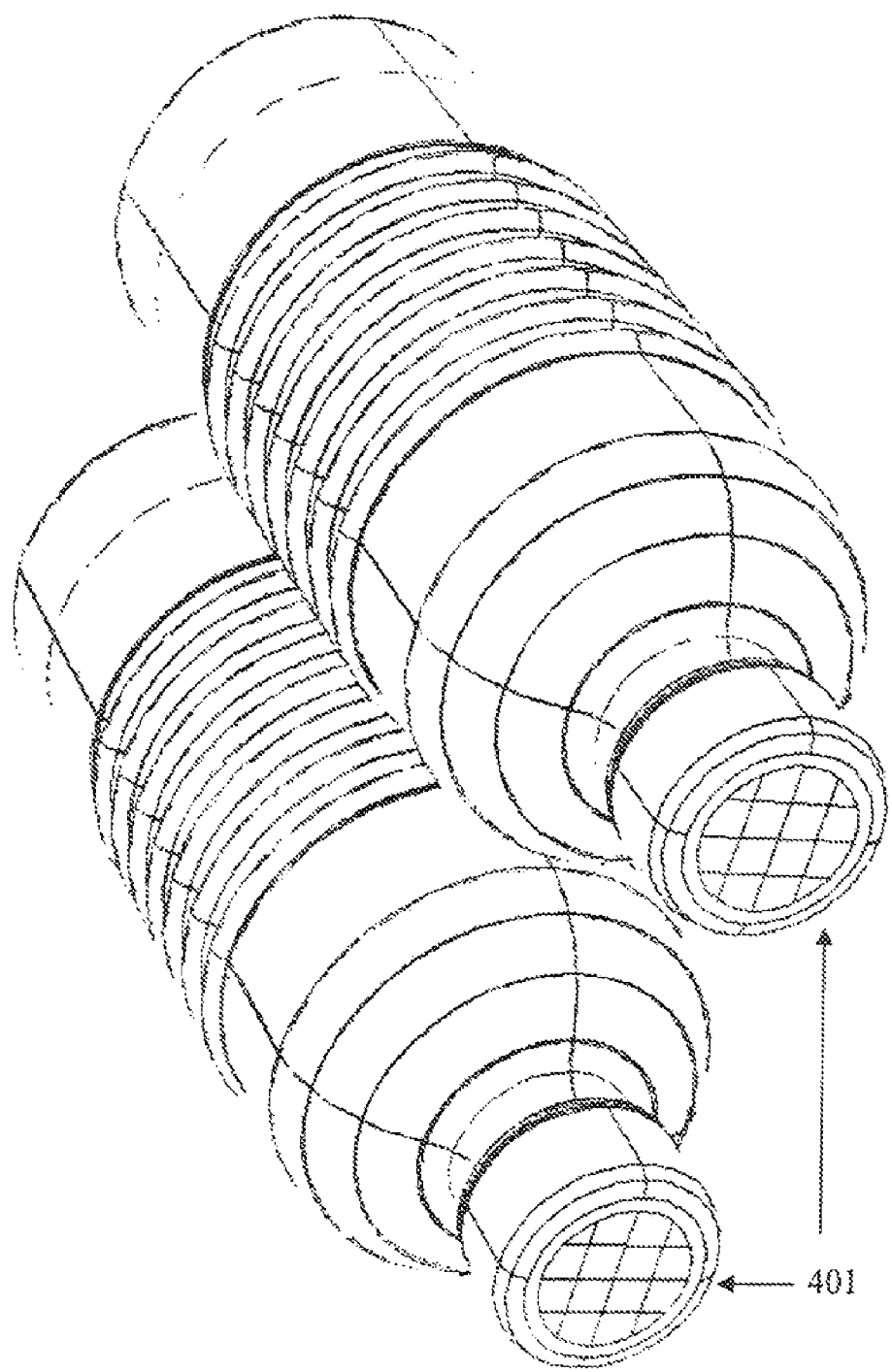
FIG. 4 is a conceptual diagram of the Bottle Telescope Binocular depicting the eye lenses that are constructed as part of the bottle cap providing a liquid seal as well as adjustable focus when used for viewing.

FIG. 3 shows an embodiment wherein 2 connected bottles are used to form bottle telescope binoculars 301. A coupling ring 302, which, in certain embodiments is similar to a six pack holder, or a plastic interconnect can connect two bottles together to form binoculars. As shown in FIG. 4, each eye lens 401 is built into the bottle cap, providing a liquid seal as well as adjustable focus for viewing.

The BottleScope can be used at sporting events such as football games, baseball games, car racing events like Indianapolis 500, basketball games, hockey games, track and field events or the Olympics. These venues are difficult for the majority of the audience to adequately view the participants or the action up close. The inexpensive BottleScope enables every member of the audience to get a close up view of the participants and activities of interest that would otherwise be missed without the aid of optical magnification. The BottleScope is intended to provide a convenient recyclable drink container that can be used as a handheld telescope or binocular after the liquid refreshment has been consumed. The BottleScope will enhance the enjoyment of the audience by providing an inexpensive optical magnification device to aid the viewing of a sporting event or other events such as parades, etc. from a distance. Another advantage of the BottleScope is that it can be used to observe stars, planets or the moon in the night sky and can serve as an important instructional aid. The BottleScope can be used as an educational learning tool as well as for recreational viewing pleasure.

In certain embodiments, the BottleScope telescope optics and container are constructed using a variety of well established plastic molding techniques suitable for mass production. The telescope objective lens is attached to the bottom of the bottle using either of two methods. One configuration of the BottleScope uses well established stretch blow molding process. The threaded neck of the bottle is produced using an initial injection molded process inside of a precisely machined BottleScope mold. The threads on the neck of the bottle provide focus adjustment of the telescope eye lens which is part of the bottle cap. The base of the bottle contains a second threaded flange. The telescope objective lens is injection molded having a surrounding annular flange containing threads. The surrounding threaded collar of the objective lens is threaded onto the base of the bottle forming a liquid seal. This method produces a three piece BottleScope.

A two piece BottleScope is constructed using the same stretch blow molding process with a different BottleScope mold. After the bottle is blown into shape inside its mold the base of the bottle is cut off. The baseless bottle is then lowered onto a heated annular base that contains the plastic objective lens in the center. The objective lens contains a molded flange that extends out beyond the edge of the lens. The open bottle is lowered such that the open ended cylinder slides inside or outside the outer edge of the lens flange. The bottle is lowered onto a heated base such that the base of the bottle is heated beyond it glass transition temperature and adheres to the molded lens that is situated inside the base mold. A sealed joint is formed with the objective lens bonded to the base of the bottle.

These innovative manufacturing steps achieve a single piece molded bottle containing a telescope objective lens. The eye piece lens or eye lens can be fabricated by direct injection molding process into the bottle cap or the lens can be pressed into a cap providing a sealed insert (similar to a mason jar). The eye lens is molded with an annular flange to form a seal.

In certain embodiments, the Bottlescope can be based on two different optical designs or configurations: the Keplerian telescope design and the Galilean telescope design.

1) The Keplerian Telescope design, which includes the following features:
   Positive objective lens at base of bottle
   Positive eye-piece in cap
   Positive eye-piece in cap with prism to invert image In the Keplerian telescope (invented by Johannes Kepler 1611) configuration, the objective lens 501 is a positive focal length lens forming a focus or real image 502 inside the bottle in front of the eye piece or eye lens 503 (see FIG. 5). The eye lens intercepts the expanding cone of light beyond the focal plane of the objective lens and collimates the light which is then focused onto the retina of the eye of the observer 504. An external pupil image is formed providing a comfortable and convenient distance (or eye relief) between the eye lens and the eye of the observer.

The threads within the bottle cap provide an inexpensive and convenient method of focusing the eye lens for various observing distances and a wide range of focus correction of the observer. Additional threads can be included in the molded cap to enable adequate focus adjustment of the eye lens during use.

The Keplerian style telescope forms of inverted image as seen by the observer 601, therefore a plastic molded prism 602 (see FIG. 6) can be attached to the inner surface of the bottle cap. The inverting prism takes up a small volume of space within the neck of the bottle and flips the image so that it is upright by the observer 603. The inverting prism can be molded plastic to minimize the cost of the bottle.

The magnification of the Keplerian telescope is equal to the ratio of the focal length of the objective lens to the focal length of the eye lens. The focal points of each perspective lens coincide. The longer the bottle, the larger the potential magnification. The magnification is the ratio of focal lengths and the separation between lenses is equal to the sum of the focal lengths which is also the bottle height. Therefore, for a given bottle height, a wide range of magnifications can be achieved using a combination of focal length objective and eye lenses. The achievable magnification of each BottleScope is dependant on the distance between the objective lens at the base of the bottle and the eye lens located in the bottle cap. A wide range of bottle heights can accommodate a wide range of telescope or binocular magnifications. For example, an objective lens having a focal length of 6" and an eye lens having a focal length of 1" produces a telescope having 6× magnification and built into a bottle that is 7" in height.

2) The Galilean telescope design, which includes the following features:
   Negative lens in cap forming a Galilean telescope
   Greater magnification for same bottle height A second telescope configuration is a Galilean type telescope (invented by Galileo Galilei in 1609) which uses a negative focal length eye lens that intercepts the focused beam of the objective lens prior to focus (see FIG. 7).

The focused beam of the objective lens 701 does not pass through a focus. The light is collimated by using a negative focal length eye lens 702 that intercepts the converging light cone from the objective prior to focus. This telescope configuration does not form an external pupil; however, the bottle can be placed at a comfortable distance from the eye of the observer 703 to view through the BottleScope and the image is upright.

The magnification of the Galilean telescope is also equal to the ratio of the focal length of the object lens to the focal length of the eye lens. In this case, however, the eye lens has a negative focal length. Therefore the spacing between the objective lens and eye lens is the difference between the focal length of the objective and the focal length of the eye lens. A wide range of magnification is achievable using a variety of focal length objective lenses and eye lens combinations as well as bottle heights. The height of the bottle and optical magnification are designed to optimize the magnification performance of the telescope as well as optimize image performance from such a simple telescope.

3) The Fresnel lens bottle telescope, which has the following feature:
   Positive Fresnel lens at base of bottle Another embodiment of the present invention utilizes Fresnel type lens or lenses. The objective lens or eye lens or both can be a press molded Fresnel lens (see FIG. 8).

The Objective lens can be a Fresnel type lens 801 forming an intermediate image 802 followed by an eye lens 803 which relays the image to the eye of an observer 804. The eye lens can also be a Fresnel type lens or a standard shape lens 901 (see FIG. 9) or the eye lens could be a Fresnel lens 803 or both lenses could be of the Fresnel type 801, 803 (see FIG. 8).

With any of the BottleScope telescope designs, more than one lens element could be utilized to maximize imaging performance and viewing enjoyment. The objective lens could be a bonded doublet lens that reduces chromatic, aberration and spherical aberration. The eye lens could be a double element lens made of more than one molded plastic or glass lens. The eye lens could be bonded together or spaced apart to maximize image performance or minimize optical aberrations such a spherical aberration and or lateral color.

Stray Light Rejection: Baffling

The performance of a telescope can sometimes be enhanced by incorporating baffling, shielding or stray light reduction features. In one configuration, the BottleScope can be constructed of a clear or transparent container. An accessory item to this design is an opaque bottle sleeve, jacket or removable "cuzzi". The opaque sleeve can be used for optimum stray light control for certain applications. In addition to an opaque sleeve covering the sides of the bottle an opaque dye can be used in the plastic mold material resulting in a dark colored bottle that is opaque or semi-translucent. Another light baffle can take the form of a dark plastic boot bonded to the base of the container with an aperture at the base of the bottle serving as an aperture stop for the objective lens.

Additional means of light baffling include a short plastic tube that is molded or threaded to the lower surface of the bottle cap. This narrow tube serves as a light baffle to block stray light from entering the observers' eye and reducing the quality of the image observed through the telescope. The short plastic tube or light baffle can flare outward in the Galilean configuration telescope to follow the shape of the light cone. The plastic baffle tube can taper inward when used in the Keplerian telescope configuration. Or the baffle tube can be a straight plastic cylinder that provides a certain amount of light baffling.

Color Correction:

In another embodiment of the present invention the telescope objective lens can be constructed using two molded lens elements 1001 (see FIG. 10) that are bonded together or spaced with a small air-gap by a step spacer molded into the outer flange of the lens. Each telescope design can incorporate a single element or double element objective lens forming a liquid seal as well as providing the best possible viewing clarity. A double element lens or doublet is commonly used in optical instruments including binoculars, telescope objective lenses and the like to reduce the spread of light (as a function of color or wavelength) along the axis of the lens. This spread of light is known as chromatic aberration or axial color.

Chromatic aberration introduces color blurring in an object and overall blurriness with colored halos surrounding point source objects. Typically a doublet lens is configured using a positive element and a negative lens element bonded together or separated by a small air-gap. The positive element typically has a higher index of refraction and dispersion (similar to crown glass) than the negative element. The positive lens focuses red light further from the nominal focal point of the lens than blue light while the negative lens does the opposite. The opposite sign of the dispersion between the lenses tends to cancel bringing both red and blue wavelengths to a common focal point. Intermediate colors are still focused beyond the ideal focal point however the displacement between focal points between colors is reduced greatly by an achromatic doublet lens. The positive optical element uses a plastic material such as polycarbonate and the negative lens element a plastic such as acrylic. The additional lens surfaces also provides additional aberration control such as spherical aberration which tends to blur an image at all wavelengths.

Additional aberration control is achieved by using a double element eye piece 1101 (see FIG. 11).

A simple two lens telescope suffers from another form of chromatic image blurring known as lateral color. Lateral color refers to an effect whereby light that leaves the eye lens is displaced laterally by increasing amounts as a function of wavelength. A two element lens with an air-gap has the ability to reduce the color displacement to tolerable levels when viewing objects through the simple telescope. Lateral color introduces a separation of colors appearing like color smear or rainbow affect or color haze. The molded plastic doublet eye piece is fabricated as a part of the bottle cap and provides additional clarity when viewing distant objects at higher magnifications. The doublet eye lens can reduce lateral color and other aberrations that vary across the observed scene such as coma or astigmatism.

Aberration Reduction and Image Quality Improvement:

Molded plastic lenses can be manufactured having spherical surfaces or aspherical surfaces. An aspheric surface can be a conic section such as a parabola, hyperbola or ellipse or any general asphere. The non-spherical surface has the ability to control the bending of light rays in a more controlled fashion than spherical surfaces producing a sharper focused image. Plastic molding can produce high quality spherical or aspherical lens surfaces. The aspheric surfaces can be used to reduce spherical aberration as well as other aberrations and can provide equivalent aberration control as a doublet lens with the exception of chromatic aberration which is a function of the dispersion properties of the lens material.

Another embodiment of the BottleScope is the use of a diffractive optical surface 1201 (see FIG. 12). A diffractive optical surface combined with a refractive optical surface has the ability to minimize chromatic aberration and when combined with an aspheric optical refracting surface also minimizes spherical aberration.

A molded aspheric diffractive singlet can be used as the objective lens resulting in a single element high precision plastic optical element. Such a lens is referred to as an achromatic singlet which traditionally as described earlier is constructed of two lens elements.

Other lens design and optical engineering methods are employed, such as lens position, lens geometry and surface shape, to minimize other aberrations such as field curvature and distortion.

Exemplary Designs:

A number of BottleScope prototypes have been constructed to demonstrate the optical quality using available plastic molding lens techniques and available plastic bottle molding techniques.

The BottleScope prototypes were constructed using the following optical prescriptions:

Objective lens focal length: 210 mm, 185 mm

Eye lens focal length: −37 mm, −42.6 mm, −56.75 mm

Example BottleScopes—

210 mm focal length objective lens with a −56.75 mm focal length eye lens producing Magnification=3.7

210 mm focal length objective lens with a −37.10 mm focal length eye lens resulting in Magnification=5.66

210 mm focal length objective lens with a −10 mm focal length eye lens producing Magnification=21

The result of these optical engineering techniques is a useful optical instrument that can be used to view objects at a distance with magnifying power ranging from 3× to 25×.

Additional Embodiments

The BottleScope is an inexpensive and very convenient tool for viewing sporting events, parades, astronomical objects such as the moon and planets such as Saturn and Jupiter with comfort and convenience. The BottleScope makes a useful instructional aid as well as a practical inexpensive telescope or binocular instrument that is constructed out of recyclable plastic.

The BottleScope uses other optical technology to create other visual sensations such as holograms. The bottle label can be constructed of a cylindrical multiplex hologram band that surrounds the bottle. The hologram images can be related to various themes such a sport events. The cylindrical hologram around the bottle can be a hologram of the planets orbiting sun for example. The light baffle or bottle sleeve can provide insulation to maintain the temperature of the refreshment in addition to containing star maps for astronomical educational or viewing enjoyment purposes. The bottle sleeve can also contain information about particular events such as a sporting event or any other event.

Having described the invention in detail, those skilled in the art will appreciate that, given the present disclosure modifications may be made to the invention without departing from the spirit of the inventive concept described herein. Therefore, it is not intended that the scope of the invention be limited to the specific embodiments illustrated and described.

The invention claimed is:

1. A bottle telescope comprising a sealable bottle having a neck and a body portion suitable for containing a fluid, the bottle comprising:
   (a) at least one objective lens built into the base of the bottle;
   (b) an adjustable eye lens built into a removable bottle cap and
   (c) a light blocking baffle, wherein the light blocking baffle is a removable tube that slides into the bottle past the neck portion and into the body portion, the tube comprising a flange that is attached to the bottle cap, wherein the bottle, when viewed through the eye lens, functions as a telescope, and wherein the at least one objective lens contains a molded flange that extends beyond the edge of the lens.

2. The bottle telescope of claim 1, wherein the fluid is a liquid beverage.

3. The bottle telescope of claim 1, further comprising a bottle sleeve approximately perpendicular to both the objective lens and the eye lens, wherein the sleeve is either external or internal to the bottle.

4. The bottle telescope of claim 3, wherein the removable cap is attached to the bottle sleeve using threads and wherein the focus of the eye lens is adjusted using threads.

5. The bottle telescope of claim 1, wherein the removable cap is attached to the bottle using threads, and wherein the focus of the eye lens is adjusted using threads.

6. The bottle telescope of claim 1, wherein the telescope has a magnification of from 3X to 25X.

7. The bottle telescope of claim 1, wherein the combined magnification of the objective and eye lens is between 3X and 25X.

8. The bottle telescope of claim 1, wherein the objective lens is molded, machined, or threaded into the base of the bottle.

9. The bottle telescope of claim 1, wherein telescope can function when the bottle contains a fluid.

10. The bottle telescope of claim 1, wherein the objective lens is an achromatic doublet lens, a Fresnel lens, a diffractive lens or a hybrid lens that combines refracting and diffracting properties.

11. The bottle telescope of claim 1, wherein the eye lens is molded, machined, or pressed into the bottle cap.

12. The bottle telescope of claim 1, wherein the telescope is based on a Keplerian telescope configuration.

13. The bottle telescope of claim 1, wherein the telescope is based on a Galilean telescope configuration.

14. The bottle telescope of claim 1, wherein the objective lens is injection molded, comprises a side flange and is welded to the base of a blow molded plastic bottle whose base has been cut off.

15. The bottle telescope of claim 1, wherein the eye lens is injection molded into the bottle cap.

16. The bottle telescope of claim 1, wherein the eye lens is pressed and sealed into the bottle cap.

17. The bottle telescope of claim 1 wherein the at least one objective lens is an aspheric, double element lens.

18. A bottle telescope comprising two sealable bottles each having neck and body portions suitable for containing a fluid, the bottles each comprising:

(a) at least one objective lens built into the base of the bottle;
(b) an adjustable eye lens built into a removable bottle cap and
(c) a light blocking baffle,
wherein the light blocking baffle is a removable tube that slides into the bottle past the neck portion and into the body portion, the tube comprising a flange that is attached to the bottle cap,
wherein the bottles are connected using a removable connector,
wherein the bottles, when viewed through the eye lens, function as a pair of binoculars, and
wherein at least one objective lens contains a molded flange that extends beyond the edge of the lens.

19. The bottle telescope of claim 18, wherein the bottle connector is part of a removable multiple bottle carry pack.

20. The bottle telescope of claim 18 wherein the at least one objective lens is an aspheric, double element lens.

21. A bottle telescope comprising a sealable bottle having a neck and a body portion suitable for containing a fluid, the bottle comprising:

(a) at least one objective lens built into the base of the bottle;
(b) an adjustable eye lens built into a removable bottle cap and
(c) a light blocking baffle,
wherein the light blocking baffle is a removable tube that slides into the bottle past the neck portion and into the body portion, the tube comprising a flange that is attached to the bottle cap,
wherein the bottle, when viewed through the eye lens, functions as a telescope,
wherein the at least one objective lens contains a molded flange that extends beyond the edge of the lens and
wherein the at least one objective lens is an aspheric lens.

22. A bottle telescope comprising two sealable bottles each having neck and body portions suitable for containing a fluid, the bottles each comprising:

(a) at least one objective lens built into the base of the bottle;
(b) an adjustable eye lens built into a removable bottle cap and
(c) a light blocking baffle,
wherein the light blocking baffle is a removable tube that slides into the bottle past the neck portion and into the body portion, the tube comprising a flange that is attached to the bottle cap,
wherein the bottles are connected using a removable connector,
wherein the bottles, when viewed through the eye lens, function as a pair of binoculars,
wherein the at least one objective lens contains a molded flange that extends beyond the edge of the lens and
wherein the at least one objective lens is an aspheric lens.

* * * * *